Sept. 29, 1959          G. L. WALLIS          2,906,437
APPARATUS FOR DISTRIBUTING FERTILISER, SEEDS, OR
POWDER OR LIQUID SUBSTANCES ON THE GROUND
Filed July 3, 1956          2 Sheets-Sheet 1

INVENTOR
GEORGE L. WALLIS
BY Emery L. Groff
ATTY

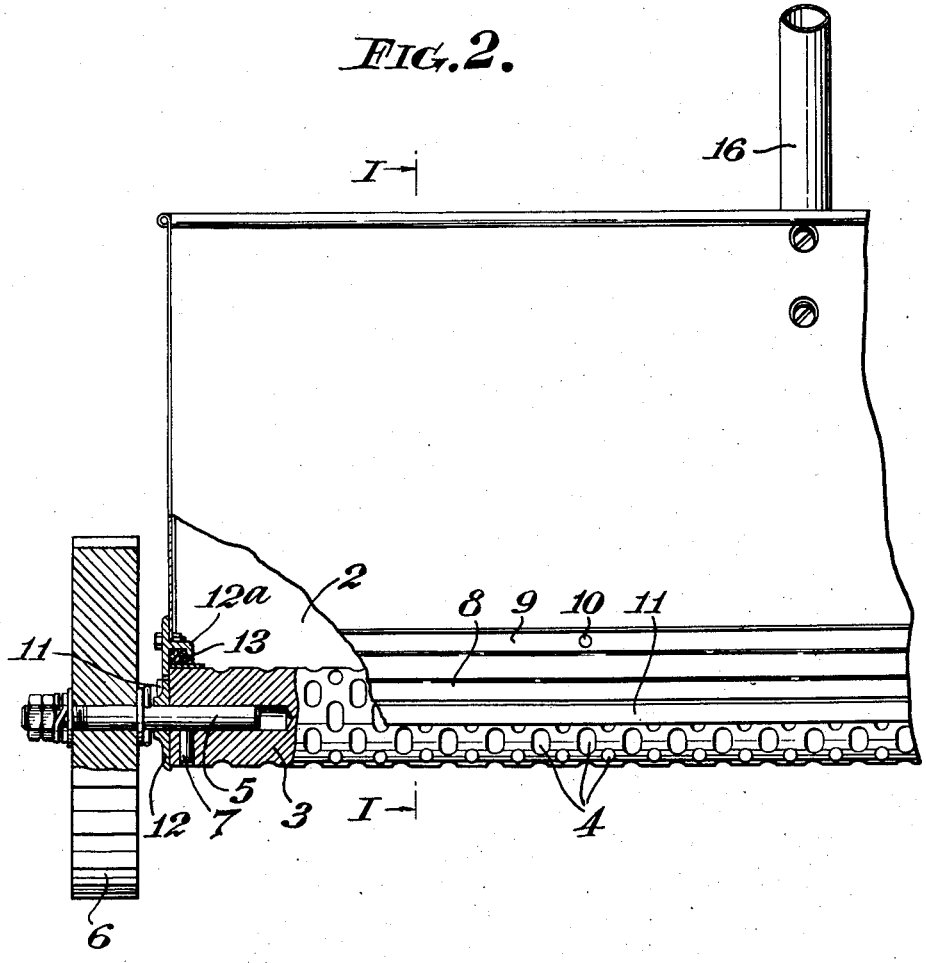

2,906,437

APPARATUS FOR DISTRIBUTING FERTILISER, SEEDS, OR POWDER OR LIQUID SUBSTANCES ON THE GROUND

George Leslie Wallis, Surbiton, England

Application July 3, 1956, Serial No. 595,664

2 Claims. (Cl. 222—177)

The present invention relates to apparatus for distributing fertilisers, seeds or powder or liquid substances on the ground, and has for its main objects to provide apparatus for this purpose which is simple and inexpensive to produce and which is efficient and durable in use.

According to the present invention there is provided apparatus for the purpose referred to, which comprises a wheeled hopper having an outlet at its lower end, closed by a rotatable roller formed with a multiplicity of recesses or the equivalent forming pockets extending both circumferentially and longitudinally of the roller and which, during rotation of the roller, become charged with the substance to be distributed as they are brought into communication with the hopper outlet and from which the substance falls during continued rotary movement of the roller, characterised in that the outlet end of the hopper is fitted with flexible and resilient scraper or stripper elements which extend longitudinally of the roller and bear thereagainst and smooth the surface of the material carried around by the pockets and so prevent the pockets discharging an excess amount of substance.

According to a preferred embodiment of the invention, the outlet end of the hopper is also fitted with seals for preventing leakage of the substance between the edges of the outlet of the hopper and the roller or scraper elements.

The seals may comprise two strips of rubber each of which is secured along one edge in a channel provided along an adjacent lower edge of the hopper, and which is adapted to bear by its other or outer edge against one of the scraper elements. Two scraper or stripper elements are provided, each of which consists of a flexible and resilient strip of rubber or stainless steel (depending upon the nature of the substance to be distributed), extending longitudinally of the roller and which is anchored at its ends, with one face bearing against the roller, in arcuate slots in bearing members for supporting the ends of the rollers.

Conveniently, the roller is connected with the ground wheels of the hopper so as to be driven thereby when the appliance is wheeled over the ground.

To enable the invention to be clearly understood a preferred embodiment thereof will now be described by way of example with reference to the accompanying drawings, wherein:

Figure 2 is a part sectional front elevation of one half of the apparatus.

Figure 1:
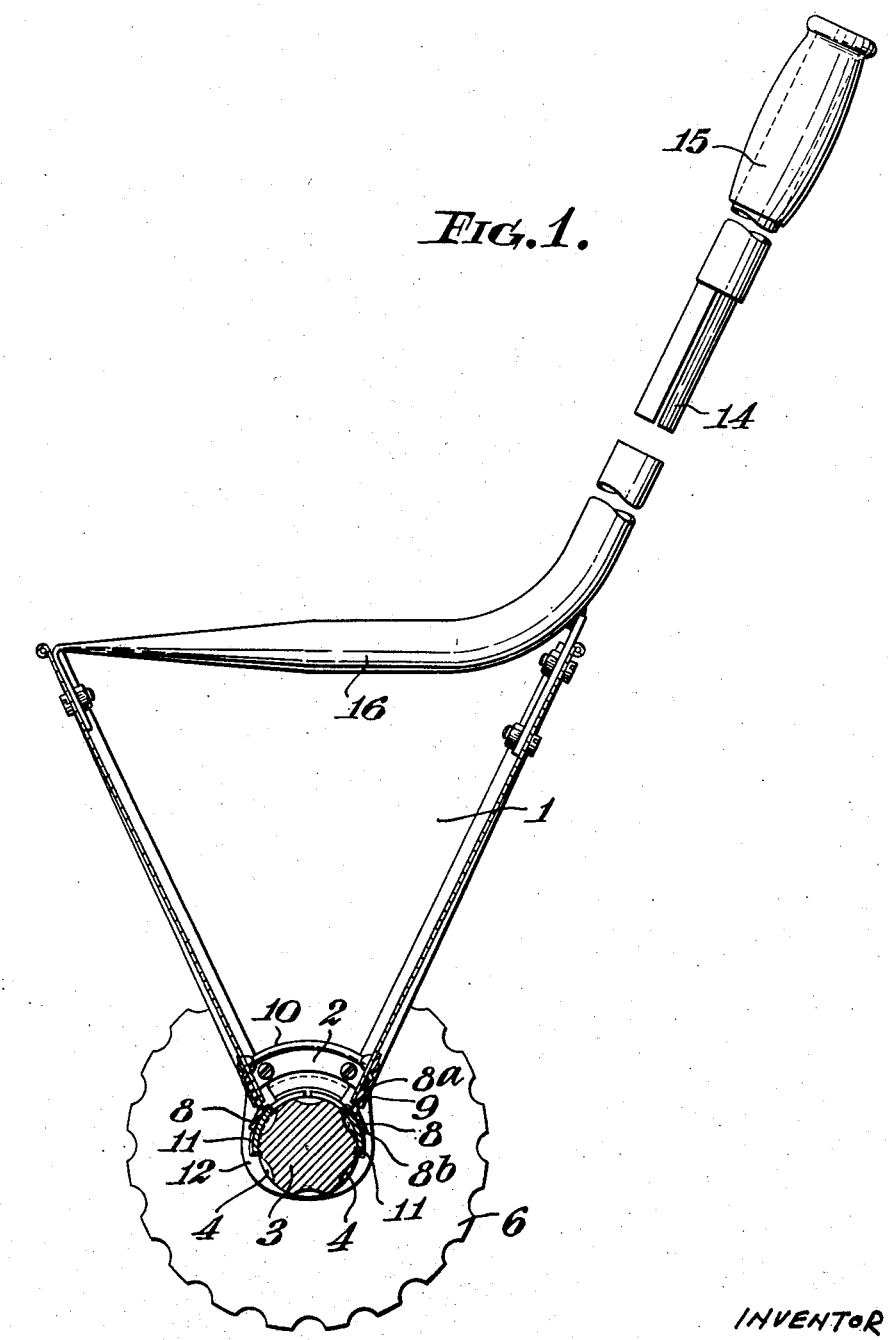
Figure 1 is a vertical section taken on the line I—I of Figure 2.

Referring to the drawings, the apparatus comprises a hopper 1 constructed in any suitable manner of sheet metal or other suitable material and the front and rear walls of the hopper slope downwardly towards one another to form an elongated rectangular outlet 2. This outlet is closed by a distributing roller 3 formed with a multiplicity of recesses or the equivalent 4 forming pockets which, during rotation of the roller 3, become charged with the substance in the hopper 1 to be distributed as they are brought into communication with the hopper outlet 2 and from which the substance falls during continued rotary movement of the roller.

The roller 3 is fitted at each end with a short spindle or stub axle 5 to which a ground wheel 6 at each end of the roller is fixedly secured and the roller 3 is locked to each spindle 5 by a screw 7 so that the roller is positively driven when the apparatus is wheeled over the ground.

In order to prevent leakage of the substance between the edges of the outlet 2 of the hopper and the roller 3, the lower longitudinally directed edges are fitted with closure members 8 comprising two strips of rubber, each of which is secured along one of its edges 8a in a channel 9 provided along an adjacent lower edge of the hopper 1, the outer part 8b of each strip has a sealing bearing against a scraper element 11 referred to hereinafter.

The channels 9 may conveniently be formed by parts which are secured to the front and rear walls of the hopper by tie rivets 10.

To ensure an even distribution of the material scraper or stripper elements 11 are provided which are formed to the radius of the roller so as to bear against the periphery of the roller 3 and smooth the surface of the material carried around by the pockets and so prevent the pockets becoming overfilled and discharging an excess amount of substance.

Each of the two scraper elements 11 consists of a strip of rubber, stainless steel or other suitable flexible and resilient material, extending longitudinally of the roller and which is anchored at its ends, with one face bearing against the roller, in arcuate slots in bearing members 12 for supporting the spindles 5 at the ends of the roller. As shown, the scraper elements 11 bear against the roller adjacent to the edges of the mouth of the hopper so that an edge of each scraper acts to displace any surplus material back into the hopper outlet.

Preferably, each member 12 is carried by a related end wall and is formed at its upper end with a channel section portion 12a for housing a sponge rubber pressure pad 13 which bears on an end of the roller 3, to provide a seal which prevents the substance to be distributed escaping past the ends of the roller.

The choice of material for the scrapers 11 will depend to a great extent upon the nature of the substance to be distributed. For distributing coarse or sandy material it is proposed to make the scrapers of stainless steel, but for distributing liquid the scrapers would be made of rubber and in this respect the two scrapers and the two rubber pressure pads 13 could be made as a single rubber moulding which could be reinforced if desired. The leading edges of the scrapers could be fitted with metal shoes.

While functioning to seal or close the bottom of the hopper at the edges thereof the closure members 8 allow flexible and free radially outward movement of the scrapers 11. Thus, if the roller becomes warped or has to admit more material to pass there-around, the flexible scraper would be allowed to move by the yielding of the seals and would ride over the material without any damage occurring. This also applies to the rubber pads 13.

It will be noticed that the ground wheels 6 will drive the roller 3 in both directions of travel so that the apparatus can be pushed or pulled in both directions of travel to effect distribution of the substance contained in the hopper 1.

The hopper is fitted with a tubular handle 14 fitted at its upper end with a rubber hand grip 15 and the lower end of the handle 14 is flattened and bent angularly to the main part of the handle so as to constitute a reinforcing strut 16 which bridges the mouth of the hopper centrally of the length thereof. If desired, the main part of the handle may be detachable from the part 16, the rear end of said part acting as a socket for receiving the lower end of the handle so that said handle can be removed and stored away inside the hopper when the apparatus is not in use.

I claim:

1. An apparatus of the class described including a hopper mounted on wheels and having front and rear walls and end walls arranged to define a bottom discharge opening, a roller having driving connections with said wheels, said roller having pockets and being rotatably journalled in the discharge opening, arcuate flexible scrapers each transversely curved on an arc, the axis of whose radius coincides with the axis of the roller, whereby the scraper conforms to and covers a portion of the face of the roller, bearing members on the said end walls supporting the ends of the roller, said bearing members having arcuate slots in which the opposite ends of the flexible scrapers are loosely supported, thereby permitting the flexible scraper to yield radially outward of the roller when lumps or obstructions lodge in any of the pockets of the roller and to conform to the outer surface of the roller, and closure members fitted to the edges of the front and rear side walls adjacent the discharge opening and in sealing engagement with the outer face of a related scraper.

2. An apparatus according to claim 1, wherein, the closure members have one edge portion thereof fitted in the channels carried by the opposite front and rear walls while their free edges yieldingly engage the outer face of a related scraper.

References Cited in the file of this patent

UNITED STATES PATENTS

| 1,089,286 | Suggs | Mar. 3, 1914 |
| 2,302,716 | Riegelsberger | Nov. 24, 1942 |
| 2,369,983 | Rodli et al. | Feb. 20, 1945 |
| 2,496,885 | Milton | Feb. 7, 1950 |
| 2,691,923 | Huck | Oct. 19, 1954 |

FOREIGN PATENTS

| 2,094 | Great Britain | of 1887 |
| 317,161 | Great Britain | Aug. 15, 1929 |